April 24, 1962    F. HARLEN ETAL    3,031,573
PRECIPITATION CHAMBERS

Filed Feb. 24, 1958    7 Sheets-Sheet 1

FIG. I.

INVENTORS
FRANK HARLEN
DANIEL J. O'SULLIVAN
DENNIS E. LAMBETH
DAVID G. A. THOMAS
By Irwin S. Thompson
ATTORNEY INVENTORS
FRANK HARLEN
DANIEL J. O'SULLIVAN
DENNIS E. LAMBETH
DAVID G. A. THOMAS
BY Irwin J. Thompson
ATTORNEY

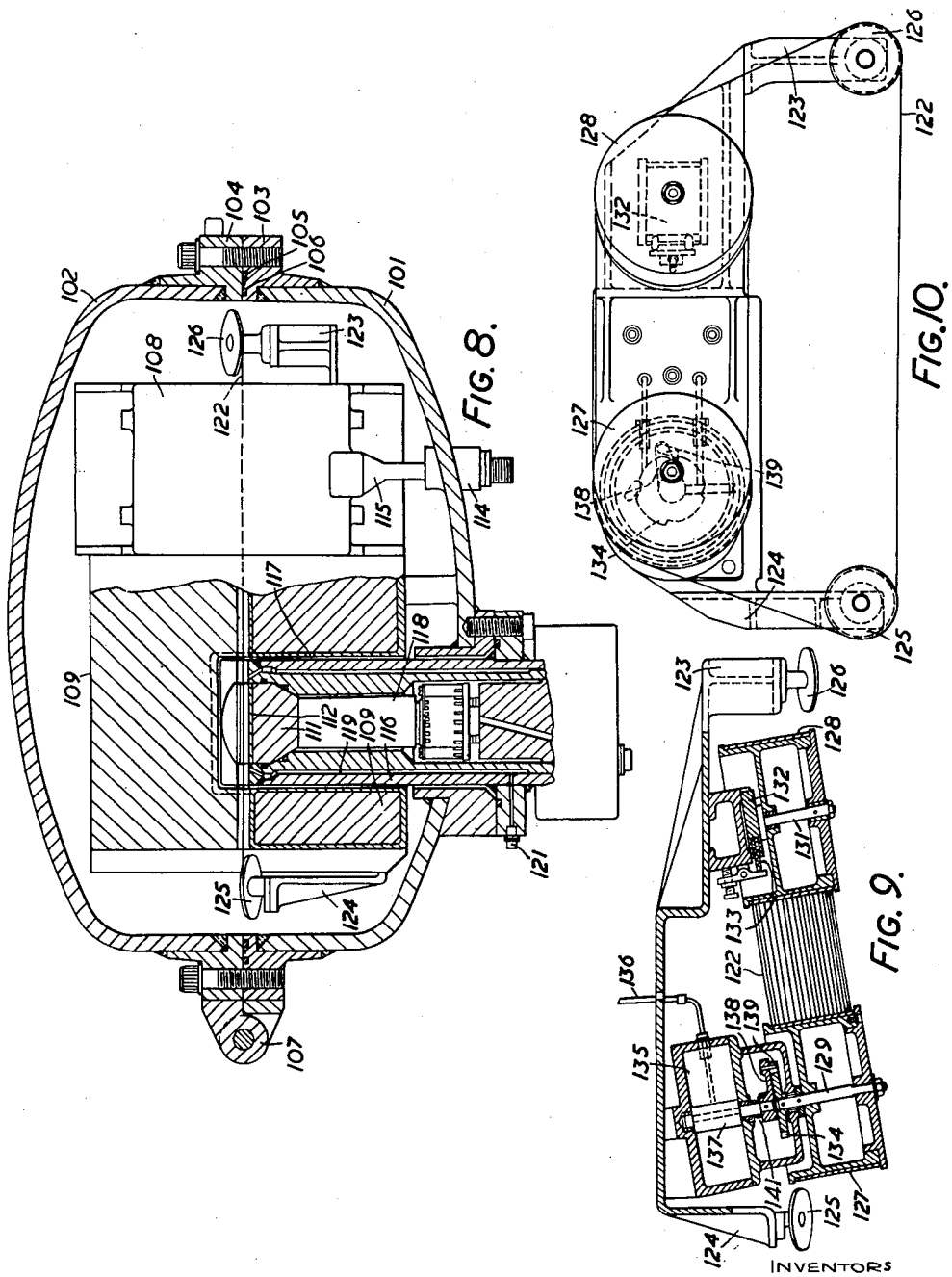

3,031,573
PRECIPITATION CHAMBERS

Frank Harlen, St. Julien Cawthorne, Barnsley, Daniel James O'Sullivan and Dennis Ernest Lambeth, Cheltenham, and David Gurney Arnold Thomas, Deerhurst Walton, England, assignors to Dowty Electrics Limited, a British company
Filed Feb. 24, 1958, Ser. No. 716,944
Claims priority, application Great Britain Aug. 22, 1956
11 Claims. (Cl. 250—71.5)

This invention relates to apparatus for the precipitation and counting of decayed fission products from gases and is intended for continuous operation in conjunction with a gas-cooled nuclear reactor to detect failure of any of the uranium fuel element containers. The invention is concerned with a precipitator and counter unit used in such apparatus of the kind which comprises an electrostatic precipitation chamber arranged adjacent to a scintillation or other counter, and a long wire or other elongated conductor mounted on drums or pulleys so that one portion of the wire or conductor passes through the chamber and the counter and is moved intermittently so that a length of the wire or conductor which has remained for a given time in the precipitation chamber passes suddenly into the counter. It is usual to mount the long wire to run around a plurality of drums or pulleys arranged in the smallest possible space, since the whole apparatus is necessarily enclosed within a pressure container operating at the pressure (about six atmospheres) of the coolant gas. Since the precipitator and counter units are continuously in operation and the wire or other conductor is continuously moving around the drums or pulleys the wire or other conductor will become fatigued and will eventually break or fray and require to be completely replaced. In accordance with present practice, precipitator and counter units may be out of action for a considerable time whilst a new wire or other conductor is threaded through the precipitator and counter unit and around all the drums or pulleys. The object of the present invention is to considerably reduce the time taken to replace the wire or other conductor in a precipitator and counter unit so that the period for which it is out of action is reduced to a minimum. The wire or elongated conductor may be in the form of an endless loop.

In accordance with the present invention in a precipitator and counter of the kind referred to, the precipitation chamber and/or the counter unit are adapted for transverse insertion therein of the wire or other elongated conductor. In this way the tedious operation of threading the wire or elongated conductor through the precipitation chamber and/or the counter is avoided. Further advantage occurs where the wire or elongated conductor is an endless loop since the wire may be completed before it becomes necessary to insert it into the precipitation and counter unit. Where the wire or elongated conductor is an endless loop it needs to be located as a plurality of turns on drums or pulleys and it would necessarily take time to wind the wire or longated conductor around the drums or pulleys.

In accordance with a further feature of the invention the wire or other conductor, particularly when in the form of an endless loop, is set up on a plurality of drums or pulleys in the correct relationship as used in the precipitation and counter unit whereby it can be transferred into the unit when required, one portion of the wire extending transversely through the precipitation chamber and counter. For this purpose the drums or pulleys may be mounted on a jig from which they may be transferred to the unit, or, alternatively, they may form part of a sub-assembly removable and replaceable as a whole in the unit.

In order that this invention may be clearly understood two embodiments thereof will be described with reference to the accompanying drawings, in which.

Figure 7:
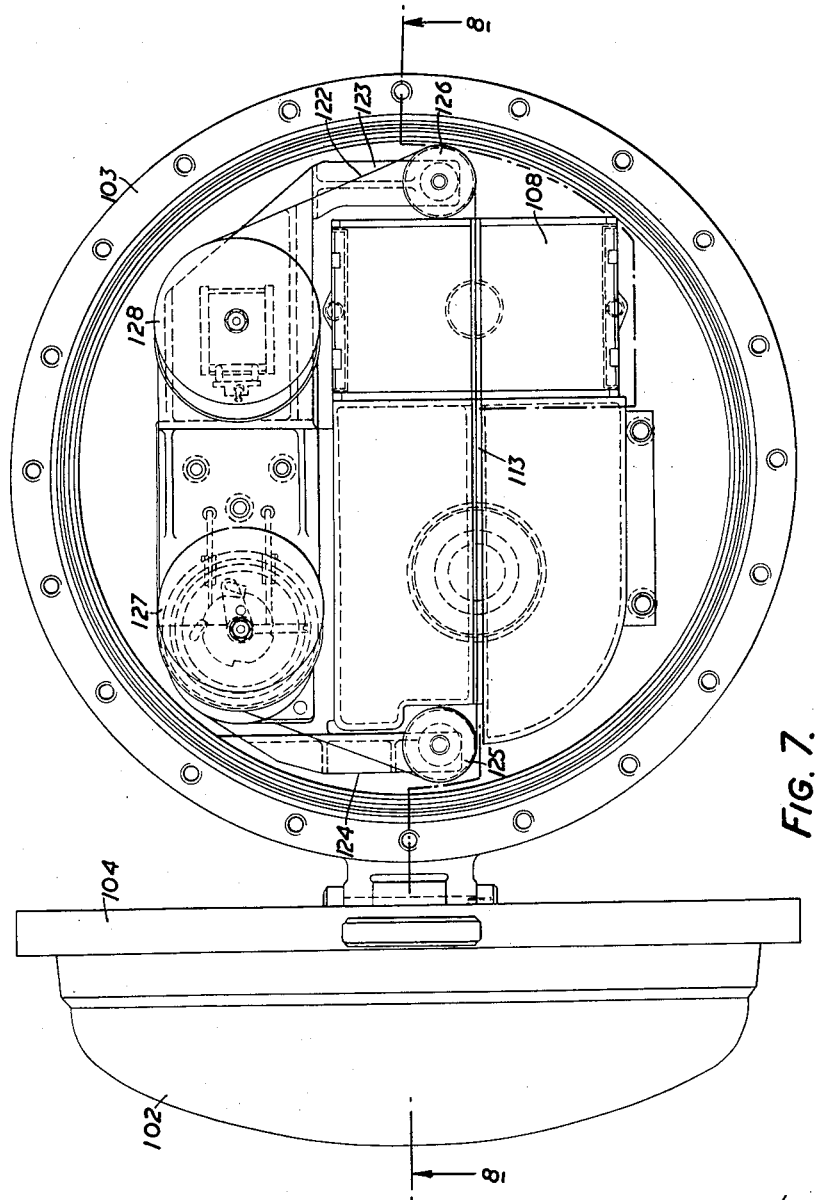
FIGURE 7 is a plan view of a second embodiment of precipitation and counter unit in accordance with the invention, the lid being in the open position.

FIGURE 8 is a cross-section on the line 8—8 in FIGURE 7, the lid being in the closed position; and FIGURES 9 and 10 are respectively section and plan of a sub-assembly carrying wire storage drums for use in the unit shown in FIGURES 7 and 8.

Figure 1:
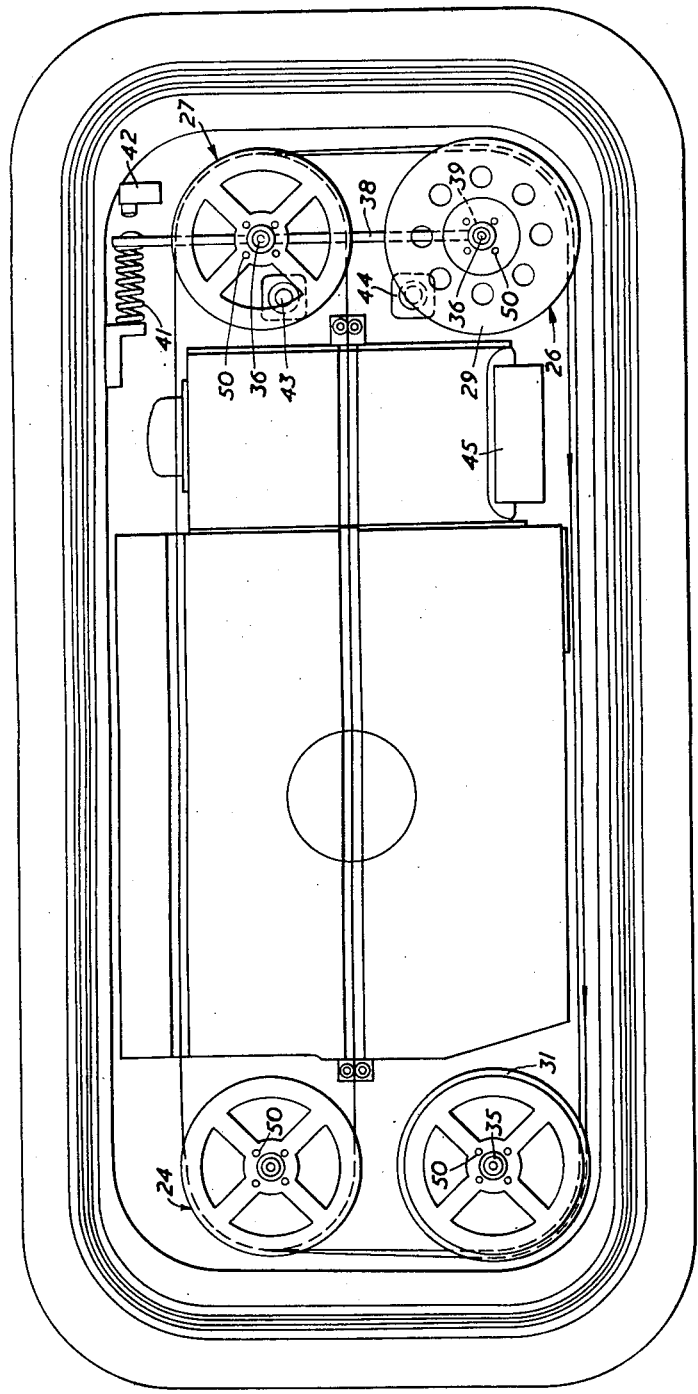
FIGURE 1 is a plan view of one combined precipitation and counter unit in accordance with the invention having the cover removed.
Figure 2:
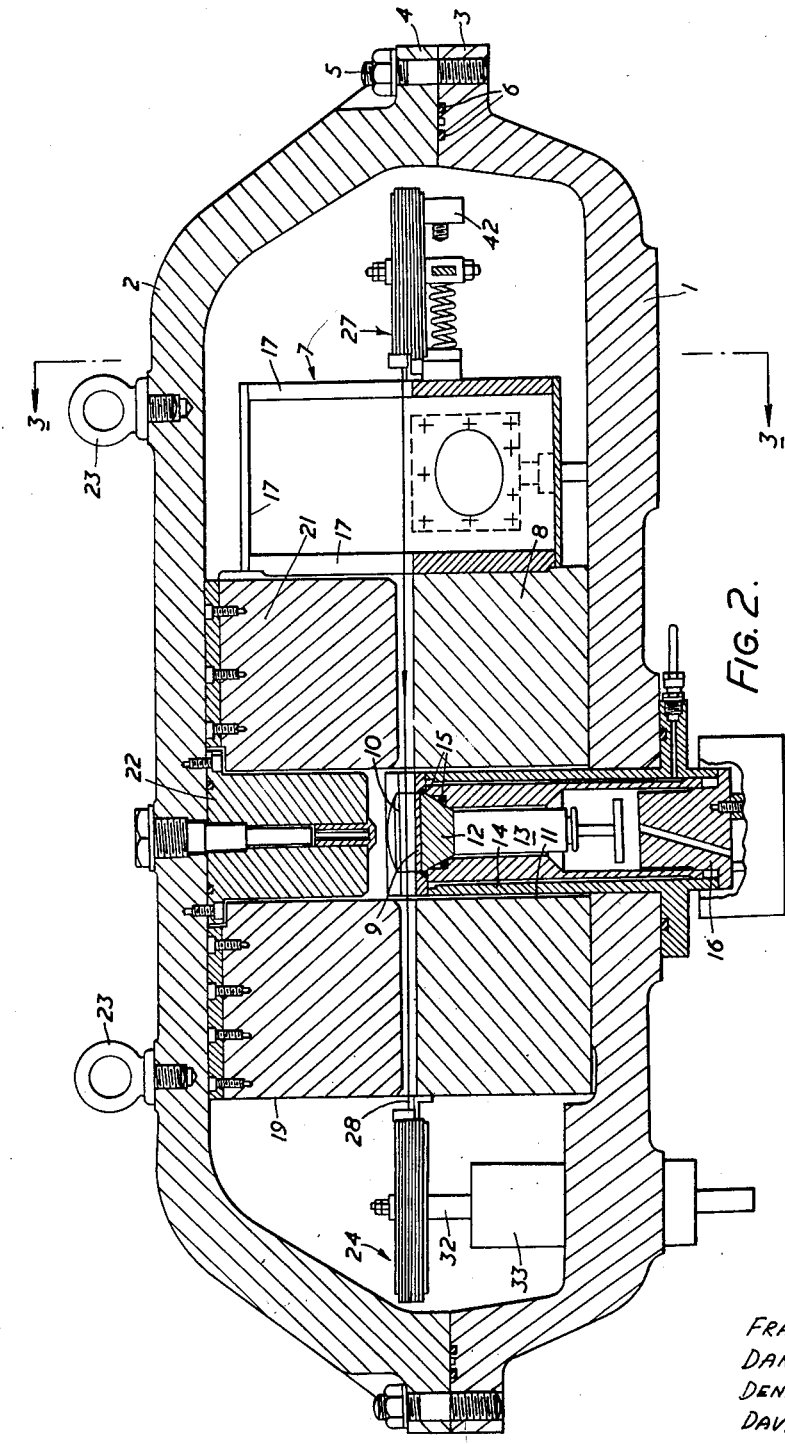
FIGURE 2 is a cross-section on line 2—2 of FIGURE 1, the cover having been secured in position.
Figure 3:
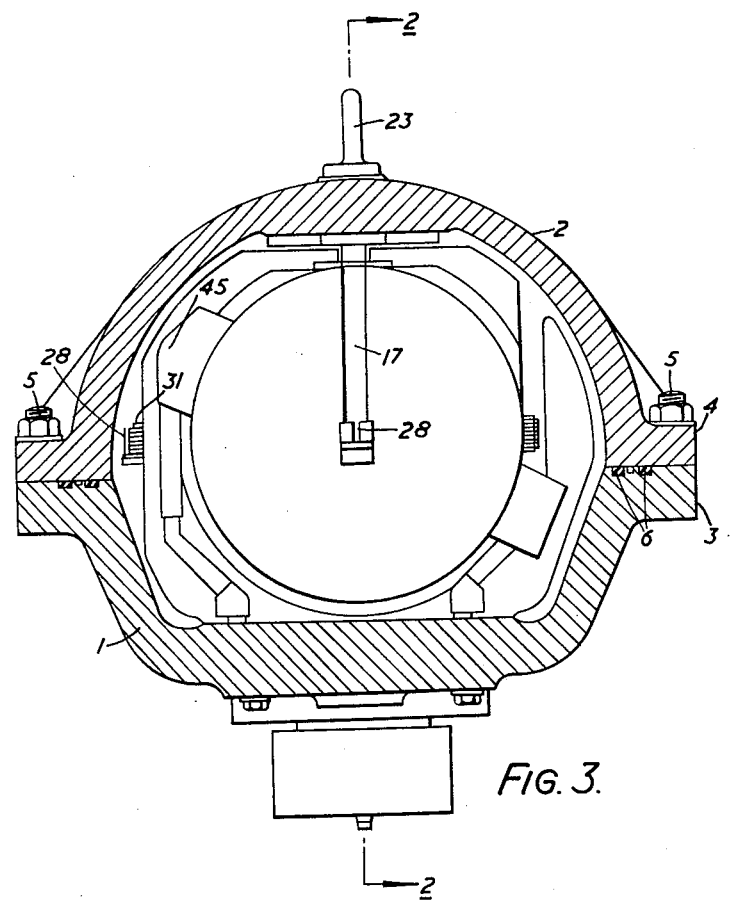
FIGURE 3 is a cross-section on the line 3—3 in FIGURE 1, the cover again having been secured in position.

Referring now to FIGURES 1, 2 and 3, the whole unit is enclosed within a pressure vessel which comprises a lower portion 1 and an upper portion 2, flanges 3 and 4 being provided respectively around the edges of the portions 1 and 2 whereby they may be secured together by a plurality of screw-threaded studs 5. To ensure gas tightness of the seal a pair of rubber sealing rings 6 are provided in the lower flange 3 which extend entirely around the flange inside the line of studs 5. The upper portion 2 of the casing is semi-cylindrical in cross-section whilst the lower portion is trapezoidal in cross-section. Within the casing there is located the precipitation chamber 7 which is disclosed in detail in our co-pending application Serial No. 679,495 from which the present application is divided. Adjacent to the precipitation chamber is a large block 8 of iron which forms a shield against extraneous radiation for a slotted phosphor 9 located in a transverse bore 11 within the shielding. The phosphor is located within a block 12 of transparent synthetic resin which forms a light guide to collect all light emitted by the phosphor and to direct it downwardly to a combined photo-cell and electron multiplier 13. The light guide is slotted at 10, this slot leading to the slotted phosphor 9. The combined photo-cell and electron multiplier is mounted within a cylindrical container 14 which extends in a sealed manner to a hole in the bottom of the casing. The pressure within the cylinder 14 is effectively atmospheric pressure, the light guide 12 forming a barrier to the escape of the pressurized gas within the casing. Seals 15 around the light guide help to ensure gas tightness. A plug 16 of lead located in the bottom of the cylinder 14 forms shielding for the phosphor 9 from the downward direction.

The precipitation chamber 7 and the shielding 8 are both provided with a longitudinally extending slot 17. In the case of the precipitation chamber the slot is preferably left open but may in use be filled with removable portions. In the case of the shielding block 8 the removable portions are in the form of two plates 19 and 21 secured by bolts to the upper half 2 of the casing together with a cylindrical plug 22 also bolted to the upper half of the casing. When the nuts are removed from the studs 5 and the upper half of the casing is lifted the shielding 19, 21 and 22 is lifted automatically with the upper part of the casing. Lifting of the latter is facilitated by lifting eyes 23.

The wire is supported on four drum assemblies 24.

Figure 5:
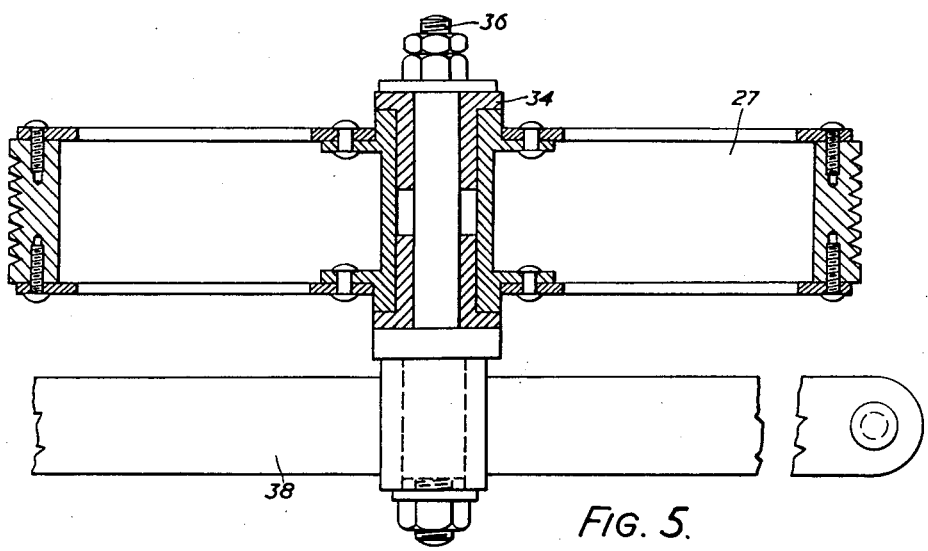
FIGURES 5 and 6 are an enlarged cross-sectional view and plan of one drum shown in FIGURES 1, 2 and 3 illustrating the method of securing in position.
Figure 6:
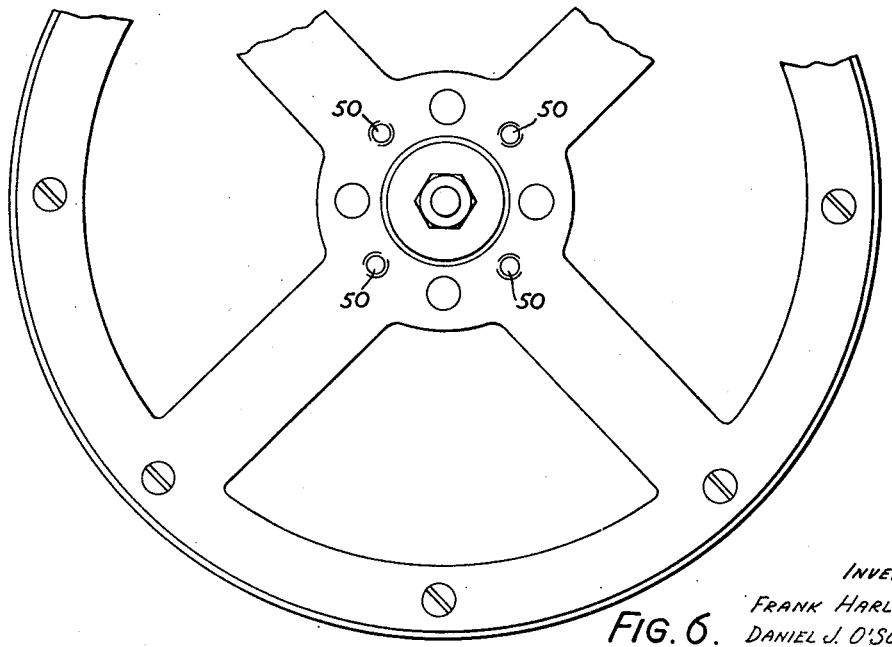

25, 26, and 27 of which the drums 24 and 27 appear in FIGURE 2. The drums 25 and 26 include a separate pulley of slightly larger diameter. The drum 27 is shown in vertical cross-section in FIGURE 5. Each of the drums 24 and 27 has seven grooves around its periphery whilst in the case of drums 25 and 26 the drum itself has only five grooves. The wire 28 is formed in an endless loop which is passed in five complete turns around the drums 25 and 26 and the lower five grooves of the drums 24 and 27. The second groove from the top in drums 24 and 27 is occupied by a further turn of wire, one run of which passes along the centre of the precipitation chamber 7, the shielding 8 and the phosphor 9. The top groove in the drums 24 and 27 is occupied by a further turn of wire which passes around the large pulley 29 forming the upper part of the drum 26. From the pulley 29 a run of wire then crosses over to the pulley 31 located at the bottom of the drum 25, this portion of wire forming a cross-over portion so that the remainder of the turns of wire form successive portions of the total endless loop. The drum 24 is fixedly mounted on a shaft 32 which extends through the lower portion 1 of the casing for connection to the intermittent driving mechanism, a sealing device being included around this shaft at 33 which prevents escape of gas in the casing past the shaft to atmosphere. The other drum assemblies 25, 26, and 27 all include sleeve bearings 34 at their centres for securing on non-rotating spindles secured in the lower part of the casing. The sleeve bearings are formed from steel or glass loaded with polytetrafluoroethylene. In each case these drum assemblies are secured in position by lock-nuts at the tops of the spindles. The drum assembly 25 is mounted on spindle 35, drum assembly 26 on spindle 36 and drum assembly 27 on spindle 37. The spindles 35 and 36 are fixedly secured to the base of the lower portion 1 of the casing whilst the spindle 37 is carried by a pivoted arm 38 which is pivoted on the lower part of the fixed spindle 36 by means of a bearing portion 39. A compression spring 41 acts on the remote end of the arm 38 pushing it toward the side of the casing thus holding all of the turns of wire in tension. A micro switch 42 is arranged adjacent to arm 38 for operation on breakage of the wire to give a warning.

The introduction of electrical connections into the casing is accomplished by a pair of sealing glands 43 and 44. These electrical connections are for the purpose of applying high potentials to the end walls of the precipitation chamber 7 as disclosed in our said co-pending application Serial No. 679,495 and also for micro switch 42. Entry of gas to be tested to and from the precipitation chamber is by means of a diffuser 45 which extends from a gas connection in the lower portion 1 of the casing whilst the gas leaves the chamber by a further pipe connection which passes through the bottom of the casing. Neither of these pipe connections is shown in the drawings.

Figure 4:
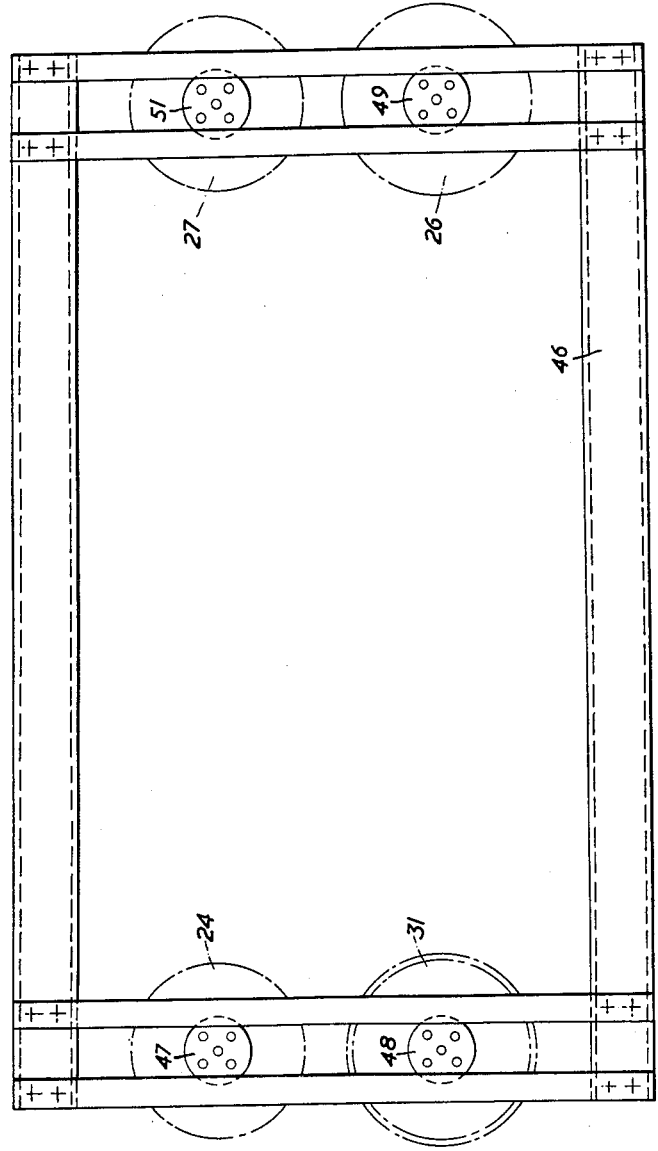
FIGURE 4 is a plan view of a jig on which the wire supporting drums are carried in their correct relative positions for insertion in the unit shown in FIGURES 1, 2 and 3.

In normal operation gas to be tested is supplied to the precipitation chamber 7 through the diffuser 45 and remains in this chamber for a short time whilst decay of the fission products takes place and the decay products are deposited on the wire 28. After a predetermined time the spindle 32 is rotated by the external motor to drive the drum assembly 24 and cause the small portion of the wire that was in the precipitation chamber to move so that it takes up a position in the phosphor 9. The activity of the deposit on the wire is then measured and, at the same time, a further charge of gas to be tested has been fed into the precipitation chamber. It will be seen that during continuous use of the apparatus the loop of wire travels continuously around the drums and is continuously being flexed. Eventually, due to fatigue the wire will break or if it is a stranded wire one or more strands will break rendering it impossible for the apparatus to operate correctly. It then becomes necessary to replace the wire. To facilitate this operation the jig illustrated in FIGURE 4 is provided. This jig comprises a framework 46 of rolled steel angle on which are secured four discs 47, 48, 49, and 51 which correspond in relative position to the spindles 32, 35, 36, and 37. On this jig are maintained four drum assemblies 24, 25, 26 and 27 around which a wire 28 is wound in the correct manner. The drums are non-rotatably secured in position by means of small screws extending through the discs 47, 48, 49, or 51 and engaging in threaded holes 50 in the upper sides of the drum assemblies. To replace the wire the upper half of the casing is removed which carries with it the inserts 19, 21, and 22 of the slot in the shielding 8. All of the drum assemblies are removed by undoing the lock-nuts 36 on the top of each spindle. The jig, as shown in FIGURE 4, is then lowered on to the apparatus so that the drum assemblies which it carries fit on their respective spindles and the wire moves transversely into its operating position, in particular the portion of the wire which extends directly between the drums 24 and 27 passes through the slots in the precipitation chamber, the shielding and the phosphor into the operating position. The lock-nuts are then screwed on to the tops of the spindles, the slot inserts 17 for the precipitation chamber are replaced and the top portion 2 of the casing is lowered into position and bolted securely down. The apparatus is then ready to be used again. It will be appreciated that the tedious procedure of threading the wire through the centres of the precipitation chamber, shielding and phosphor and the winding of the wire around the drums during the period in which the unit is out of operation has been avoided thus speeding up the replacing of the wire very considerably.

Reference is now made to FIGURES 7, 8, 9 and 10 of the accompanying drawings.

The pressure vessel is formed in two halves 101 and 102 which are conveniently formed from the ends of the standard type of gas pressure vessel normally used for storing gas under pressure. These two halves are provided with welded flanges 103 and 104 which may be secured together by means of a plurality of screw-threaded bolts. Sealing is effected interiorly of the bolts by means of two O-rings 105 and 106. The two halves of the pressure vessel are linked together by a hinge 107 secured to the flanges 103 and 104. Interiorly of the apparatus a cylindrical precipitation chamber 108 is mounted which is a constructed substantially as disclosed in our aforesaid prior Patent Application Serial No. 679,495. Adjacent to the precipitation chamber 108 a mass of shielding 109 is provided which encloses a light guide 111 of transparent material within which a tubular phosphor 112 is located. The precipitation chamber 108, shielding 109, light guide 111 and phosphor 112 include a longitudinal slot indicated generally at 113 through which a length of wire may be inserted transversely into the operating position. Closure members (not shown) fill the slot in the precipitation chamber and shielding when the wire has been inserted. The shielding 109, in order to reduce its size to a minimum, is comprised by a fabricated steel container filled with lead. The reason for arranging the shielding in this manner is to prevent lead coming directly into contact with the coolant gas and so in the course of time contaminating the fuel element containers within the nuclear reactor. The gas samples from the nuclear reactor to be checked are fed into the pressure vessel through a pipe 114 passing through the lower half 101 of the pressure vessel and feeding through a diffuser 115 into the precipitation chamber. A further pipe connection (not shown) carries the gas away from the pressure vessel. The light guide 111 is mounted within a housing 116 which extends through the bottom of the pressure vessel into a cylindrical recess 117 within the shielding 109, and centrally within the housing 116 a photo-electric cell 118 is mounted. The photo-electric cell is a substantially standard piece of apparatus including electron multiplying apparatus and adapted for connection to an external amplifier and counter again of standard design. The light guide itself forms a pressure barrier between the high pressure within the pressure vessel and the low pressure within the housing 116. Passages 119 are provided within the housing 116 which terminate adjacent to the phosphor 112 internally of the apparatus and externally are joined to a pipe connection 121. The purpose of these passages is to allow a clean supply of coolant gas to be fed to the phosphor in order to clear it when necessary of gas contaminated with fission products.

The elongated conductor employed in this apparatus is a wire 122 which is carried by a sub-assembly (FIGURES 9 and 10) which fits into the pressure vessel and includes a pair of arms 123 and 124 which embrace the ends of the shield 109 and the precipitation chamber 108. On the ends of the arms 123 and 124 a pair of small pulleys 125 and 126 are mounted across which a portion of the wire 122 extends within the slot provided in the precipitation chamber 108 and shielding 109. The sub-assembly carries a pair of rotatably mounted drums 127 and 128 which may have a smooth surface or, alternatively, be grooved. Still further, they may have a rubber covered surface. The store of wire 122 is wound around the surfaces of the drums 127 and 128 with adjacent turns in contact or substantially in contact. The adjacent turns may be guided on to the drums by means of combs (not shown). The spindles 129 and 131 on which the drums 127 and 128 are mounted are parallel with one another, but are inclined in such a manner that wire from the upper end of drum 128 may feed on to pulley 126 whilst wire to the lower end of drum 127 may be fed from pulley 125. The spindle 131 is carried on a slide 132 which is located by means of a spring 133 to tension the wire in the whole loop. The spindle 129 is rigidly connected to drum 127 and at its lower end carries a ratchet wheel 134 by which intermittent drive is applied. This drive is applied by means of a radial vane type piston which is rotatable within a short cylindrical vessel 135 by means of a variable gas pressure applied through a pipe 136. The vane is carried on a central spindle 137 which extends externally of the cylinder 135 and carries an arm 138. On the end of arm 138 a pawl 139 is mounted for engagement with the ratchet wheel 134. A torsion spring 141 encircles the external part of shaft 137, the function being to return the vane and the arm 38 to a predetermined starting position after operation of the motor by an applied gas pressure. To facilitate development of differential pressures on either side of the movable vane a fixed radial vane (not shown) is provided within cylinder 135 which seals against the two end walls, the circular wall and the shaft 137. One side of this fixed vane is open to gas pressure in the interior of the pressure vessel whilst the other side of this vane is connected to pipe 136.

When in operation gas samples are fed to the pipe connection 114 from a selector valve, operation of this selector valve being synchronised with the operation of a valve which controls supply of gas at a differential pressure to the pipe 136 for operation of the wire driving motor. When this gas at differential pressure is applied to the pipe 136 the vane will revolve the drum 137 a predetermined angular amount and the wire 122 will move a predetermined amount through the precipitation chamber and counting unit so that the portion which has remained within the precipitation chamber for a given time is then passed into the phosphor 112 whereby its activity may be counted. This intermittent movement of the wire enables continuous checks to be made on gas samples.

When the wire ultimately breaks or frays due to fatigue and it is necessary to replace the wire the cover 102 is unbolted and the closure members for the slot 113 in the shielding 109 and precipitation chamber 108 are removed. The sub-assembly as shown in FIGURES 9 and 10 is then unbolted from the lower part 101 of the casing and removed and a substitute sub-assembly is fitted in position on which a new wire has been correctly assembled. The portion of the wire extending through the precipitation chamber and phosphor will fit into the slot 113 into its operating position. It is necessary to secure a gas connection to the motor and then the closures for the slot 113 are replaced and the cover rebolted in position.

It will be seen that the replacing of the wire is quite simple and that tedious threading of the wire through the precipitation chamber and phosphor and winding of the wire around the drums is avoided during the period that the apparatus is out of service.

Whilst in both of the described embodiments reference has been made to the use of an endless loop of wire it will be appreciated both that any other form of elongated conductor may be employed and that to obtain advantage from the invention this conductor need not necessarily be endless. Advantage is gained if, for example, the conductor has two ends and is wound on reels for passage through the precipitation chamber and counter, at least the operation of threading through the precipitation chamber and counter being avoided during the period that the apparatus is out of service.

This application is a continuation-in-part of application Serial No. 679,495, filed August 21, 1957.

We claim as our invention:

1. A precipitator and detector unit to precipitate and detect decayed fission products from gases comprising an electrostatic precipitation chamber, entry and exit openings carrying the gas to and from the chamber, a long conductor extending through the precipitation chamber on which fission products are deposited, a detector unit adjacent to the precipitation chamber through which the long conductor passes, storage means for the conductor, and drive means to move the long conductor from the storage means longitudinally through the precipitation chamber to the detector unit whereby the latter can detect the activity of deposit on the conductor, the precipitation chamber having an opening to allow insertion of the conductor into its operative position by movement transverse to its length.

2. A precipitator and detector unit as claimed in claim 1, wherein the precipitation chamber has a portion thereof which is temporarily removable to form the said opening.

3. A precipitator and detector unit as claimed in claim 2, wherein the detector unit has an opening so disposed as to allow insertion of the conductor into its operative position by the same transverse movement by which the conductor enters the precipitation chamber.

4. A precipitator and detector unit as claimed in claim 3, including shielding surrounding the detector unit, a portion of this shielding being temporarily removable to form an opening by which the conductor may pass into the operative position in the detector unit by the same transverse movement by which the conductor enters the precipitation chamber.

5. A precipitator and detector unit as claimed in claim 4, enclosed within a pressure resisting container formed to include a removable portion which gives access to the openings in the shielding, detector unit, and precipitation chamber.

6. A precipitator and detector unit as claimed in claim 5, wherein the storage means comprises a plurality of pulleys between and around which the long conductor is mounted as a flexible closed loop, one length of the conductor between two pulleys passing through the precipitation chamber and detector unit.

7. A precipitator and detector unit as claimed in claim 6, including a plurality of mutually parallel spindles on which the pulleys are detachably mounted and which extend in the direction of the openings in the shielding, detector unit, and precipitation chamber whereby a complete assembly of pulleys and flexible closed conductor loop may be easily inserted into the operative position.

8. A precipitator and detector unit to precipitate and detect decayed fission products from gases comprising a pressure resisting container of which a portion is detachable to give access to the interior thereof, a precipitation chamber entry and exit openings carrying gas to and from the chamber, a scintillation phosphor to detect the fission products, shielding enclosing the phosphor, along flexible conductor extending through the precipitation chamber and through the shielding to the phosphor, and a conductor storage unit to store the conductor within dimensions much smaller than the total length of the conductor, all of which are located within the container, the conductor storage unit being attachable as a whole into the container such that a portion of the conductor carried by the storage unit will enter transversely to its length through a slot-like opening into its operative position within the precipitation chamber and shielding.

9. A precipitator and detector unit as claimed in claim 8, wherein the conductor storage unit includes a pair of spaced arms and a pulley rotatably mounted on each arm to support a portion of the conductor as a straight tensioned length which enters into the slot-like opening during insertion of the storage unit into the container to its operative position.

10. A precipitator and detector unit as claimed in claim 9, wherein the storage unit includes a pair of drums mounted for rotation about parallel axes and a motor to drive one drum intermittently, the conductor being in the form of a long closed loop stored in a plurality of consecutive turns about the drums apart from a portion of the conductor which extends to and between the pulleys.

11. A precipitator and detector unit as claimed in claim 10, wherein the pressure resisting container is of flat cylindrical form, and wherein the two drums are located close to one side of the precipitation chamber, and shielding when the storage unit is in position whilst the pulleys are located at the ends of the slot to form a compact arrangement for fitting into the pressure resisting container.

References Cited in the file of this patent

UNITED STATES PATENTS

| | | |
|---|---|---|
| 2,576,616 | Livingston et al. | Nov. 27, 1951 |
| 2,751,505 | Anderson | June 19, 1956 |

OTHER REFERENCES

Nucleonics, vol. 14 (Dec. 1956), pp. 520, 521.
Nucleonics, vol. 6 (Apr. 1950), pp. 44–46 (article by Kuper et al.).
DP–188, USAEC Report dated Nov. 1956 by Collins, pp. 4–7, 13–15.